Figure 1:
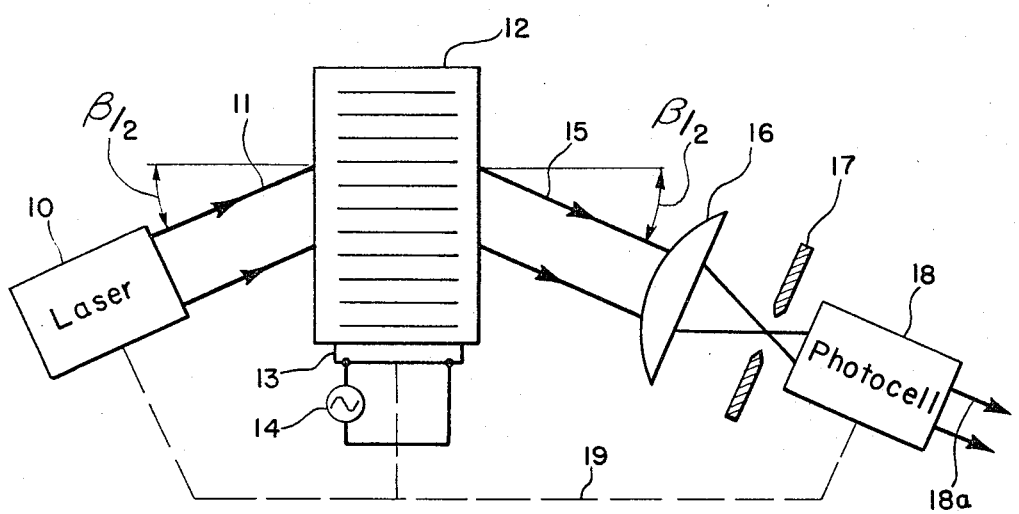

INVENTOR.
Peter C. J. Desmares

United States Patent Office
3,383,627
Patented May 14, 1968

3,383,627
WAVE SELECTOR WITH TAPERED ACOUSTIC TRANSDUCER
Peter C. J. Desmares, Chicago, Ill., assignor to Zenith Radio Corporation, Chicago, Ill., a corporation of Delaware
Filed Aug. 3, 1965, Ser. No. 476,872
8 Claims. (Cl. 332—7.51)

The present invention pertains to a wave selector. More particularly, it pertains to apparatus utilizing interaction between sound and light to select from among a range of signal frequencies.

In the copending prior application of Robert Adler, Ser. No. 388,589, filed Aug. 10, 1964, and assigned to the same assignee as is the present invention, apparatus is disclosed wherein sound waves are propagated across the path of a light beam as a result of which the light beam is diffracted. Such interaction between light and sound waves is utilized in conjunction with a subsequent light responsive device for any of a variety of purposes including derivation from the diffracted light beam of a signal which represents modulation on the sound wave carrier frequency. Without the use of specific modifications upon the basic approach, suitable interaction between the light and sound waves is possible only over a limited range of sound frequencies. This is recognized by Adler who also discloses techniques for adjusting the physical positioning between the light and sound waves in order to obtain the angular relationships necessary for the desired diffraction over a wide frequency range of the sound energy.

The terms "light" and "sound" as utilized herein distinguish only most generically, indicating only a relative frequency difference. That is, "light" embraces electromagnetic radiation both above and below as well as in the visible frequency spectrum and "sound" includes not only audible acoustic waves but also wave energies at frequencies extending even into the microwave region.

It is a general object of the present invention to provide a new and improved wave selector of the light-sound interaction type.

It is another object of the present invention to provide a new and improved wave selector apparatus of the light-sound interaction type which is selective in response to a simple linear movement.

In accordance with the invention, wave selection apparatus includes means for developing a beam containing waves of spatially coherent substantially monochromatic light together with means responsive to acoustic signals variable over a predetermined frequency range for propagating acoustic waves in a predetermined direction. The acoustic responsive means includes a transducer having a tapered thickness. The taper enables a variation in response of the transducer corresponding to a change in frequency of the acoustic signals. The apparatus further includes means for moving the transducer relative to the beam for aligning the acoustic waves in interacting relationship with the beam and means responsive to a portion of the light being diffracted by the acoustic waves for developing a corresponding signal.

Figure 2:
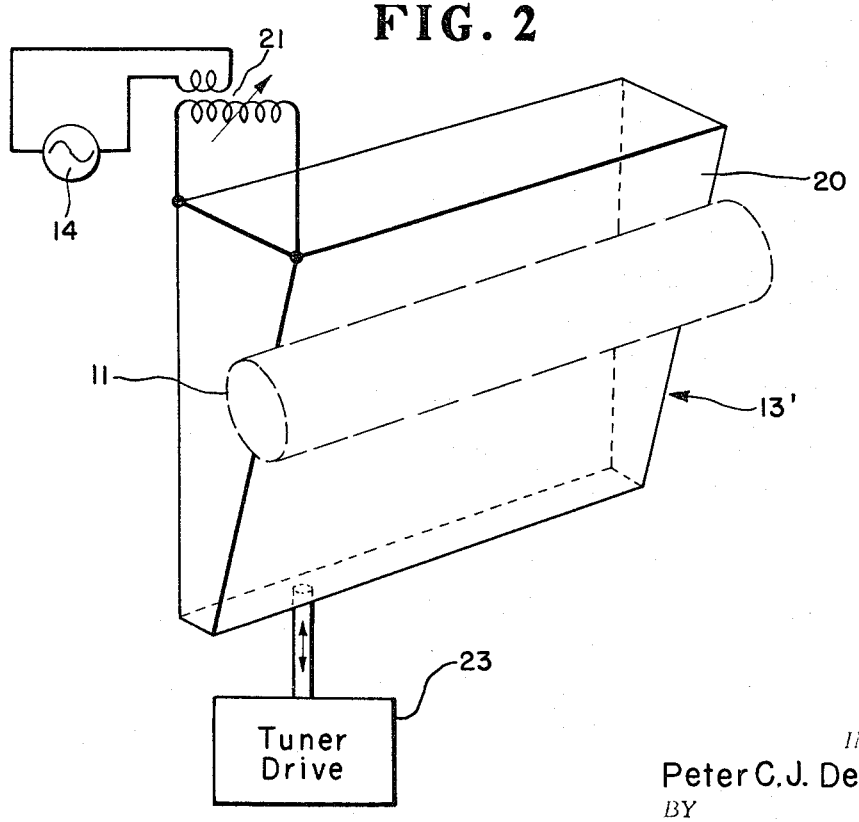

The features of the present invention which are believed to be novel are set forth with particularity in the appended claims. The organization and manner of operation of the invention, together with further objects and advantages thereof, may best be understood by reference to the following description taken in connection with the accompanying drawing, in the several figures of which like reference numerals identify like elements and in which:

FIGURE 1 is a schematic diagram of a system in which the present invention may be embodied; and FIGURE 2 is an enlarged prospective schematic view of an element utilized in the system of FIGURE 1 in accordance with the invention.

In the system of FIGURE 1, a light source 10, typically a laser, projects a beam of plane waves of substantially coherent monochromatic light along a beam path 11. Disposed across beam path 11 is a light-sound interaction cell 12 driven by a transducer 13 from a signal source 14 to produce sound wave-fronts indicated by the equi-spaced line pattern in cell 12. Light diffracted from cell 12 along a path 15 is focused by a lens 16 into an aperture or slit 17 from which the light energy is detected by a photocell 18 to develop electric signals on terminals 18a. In overall function, the apparatus develops at terminals 18a detected audio or video signal energy contained as modulation upon the carrier, the modulated carrier being supplied from source 14 which in this instance is a source of amplitude-modulated signals.

In principle, it is not necessary to utilize a laser although its use is preferred because of the extremely high intensity of light output available in a single spatially coherent wave. A beam of the required character also can be obtained by passing light produced by a line filament through a narrow slit following which it is collimated by a projection lens and passed through a suitable color filter.

In this instance, interaction cell 12 constitutes a diffraction grating and includes a medium such as water through which beam 11 is projected and which also propagates acoustic waves across the beam to create a diffraction grating corresponding to the pattern of the sound waves in the medium. Transducer 13 is exemplified by a thickness-mode piezoelectric ceramic element immersed in the acoustic medium. The grating constant, that is, the number of acoustic wavelengths per unit length, is proportional to the carrier frequency of the signal from source 14. Under some circumstances it may be necessary to provide a sound attenuator at the inner surface of cell 12 opposite transducer 13 to prevent interference from reflected sound waves.

A variety of light patterns may emerge from diffraction grating 12 depending on the relative orientation of the sound and light. The diffraction angle, as measured between the diffracted beam and the original beam path direction, is a function of the wavelengths involved. When the light is incident on cell 12 along a path parallel to the sound wave-fronts, the light pattern which emerges from cell 12 for each given set of conditions is distributed among a number of angles referred to in the art as "orders." The zero order represents that portion of the light which passes straight through cell 12, while the successively higher orders (1, 2, 3 etc.) appear symmetrically to either side of the zero order. The signal selector, comprised of lens 16, aperture 17 and photocell 18, is positioned to be receptive to light of an order other than the zero order preferably to the first order.

In operation, for a given frequency of the carrier signal from source 14, the desired order may be detected only with the selecting apparatus positioned at a given angle relative to the normal to grating 12. Preferably, the amplitude of the sound waves is within a range in which the field intensity of the diffracted light remains approximately proportional to the signal amplitude developed by transducer 13. The fundamental expression for this diffraction relationship is:

$$\sin \alpha_n = \frac{n\lambda}{\Lambda} \qquad (1)$$

where $\alpha_n$ is the angle indicated in FIGURE 1 by the symbol $\beta/2$, the angle between the sound wave-fronts and the emerging light beam. $n$ is an integer denoting the order of the diffracted light pattern, $\lambda$ is the wavelength of the light, and $\Lambda$ is the wavelength of the sound.

As a preferred system arrangement, the light emerging from cell 12 is combined into a single beam, instead of being spread among a number of orders, by orienting the sound wave-fronts in cell 12 with respect to the light wave-fronts in beam 11 in accordance with the Bragg relationship. That is, beam 11 enters cell 12 at an angle $\beta/2$ between the beam and the sound wave-fronts so that the Bragg angle $\beta$ between the diffracted and undiffracted light beams is determined in accordance with the condition:

$$\sin \frac{\beta}{2} = \pm \tfrac{1}{2} \frac{\lambda}{\Lambda} \qquad (2)$$

With this condition, the light beam emerging along path 15 leaves cell 12 at same angle $\beta/2$ from the sound wave-fronts. The $\pm$ sign in the relationship represents angular direction respectively below or above the sound wave-fronts.

For a given angular relationship, or a set of angular relationships, of the output receptor system with respect to cell 12 and utilizing a conventional planar piezoelectric transducer element, only a limited range of frequencies of the signal from source 14 may be detected. To enable an increase in that range with preservation of at least approximate Bragg relationship, FIGURE 1 also depicts an orientation coordinating device 19. Device 19 is simply a mechanical bar-link and pivot assembly which maintains laser 10 and the photocell receptor assembly oriented toward cell 12 so that the beam enters the cell at the angle $\beta/2$ and the receptor assembly is positioned to receive the light emerging from the cell at the Bragg angle $\beta$. Device 19, therefore, maintains the relationship in which the acoustic waves intersect the light waves at the desired angle.

While device 19 increases the facility of obtaining proper operation over a range of acoustic frequencies, overall performance of the system of FIGURE 1 is limited by the bandwidth of transducer 13. In order to increase the bandwidth and, at the same time, to increase the frequency selectivity of the system, the apparatus of FIGURE 1 is modified by substitution of transducer 13' illustrated in FIGURE 2. In FIGURE 2, the only primary elements illustrated are a transducer 13' and light beam 11, it being understood that light beam 11 is passing through a sound propagating medium such as the water in cell 12.

Transducer 13' propagates the acoustic waves from its face 20 in a direction toward light beam 11 so as to interact with the latter when it is properly positioned with respect to transducer 13'. Transducer 13 is made of a piezoelectric material having face 20 and the opposite face composed of an electrically conductive material between which is sandwiched the actual piezoelectric element. Signal source 14 is coupled to transducer 13' through a tunable transformer 21 the inductance of which is adjustable to tune out the capacitance of transducer 13' and afford significant frequency selectivity in itself.

As herein employed, transducer 13' tapers in thickness along the illustrated vertical dimension of the transducer which is transverse to the direction of sound propagation. Either the piezoelectric element or the thickness of the electrodes on its opposing faces may be tapered. For any given frequency of signals from source 14, the thickness of transducer 13' is resonant somewhere along its height as shown in FIGURE 2. Thus, the range of thickness over which the transducer responds corresponds to the range of frequencies over which selection is to be made. In operation, transducer 13' responds in a region where the thickness corresponds approximately to a half wavelength, or an integral multiple of a half wavelength, at the sound frequency.

Thus, as the signal frequency from source 14 is changed from the low end of the range to the high end of the range, the location on face 20 from which the acoustic waves are developed and propagated changes correspondingly from the thickest to the thinnest portions of transducer 13'. To achieve wave selection, transducer 13' is caused to be moved laterally to the direction of sound propagation by a tuner drive mechanism 23. In elementary form, the drive mechanism need be nothing more than a support within which transducer 13' is movable together with any means for pushing it in one direction or another. With a given signal frequency from source 14, transducer 13' is moved by drive mechanism 23 to position the portion of the transducer then responding to and developing the acoustic waves so that the latter intersects light beam 11. As a result, light beam 11 is diffracted in the manner previously discussed with respect to FIGURE 1. Of course, the system may be arranged so that light beam 11 is the movable element.

In the adaptation of the overall system, the operation of tuner drive 23 preferably is ganged with device 19 and the tuning mechanism for transformer 21. As a result, the system permits selection from within a wide range of sound frequencies and automatically with a high degree of selectivity at any desired frequency. While transducer 13' is illustrated to have a linear taper, any contour may be chosen in correspondence with the desired relationship of frequency and mechanical tuning movement.

While a particular embodiment of the present invention has been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:
1. Wave selection apparatus comprising:
   means for developing a beam containing waves of spatially coherent substantially monochromatic light;
   means responsive to acoustic signals variable over a predetermined range for propagating acoustic waves in a predetermined direction, including a transducer having a thickness which is tapered along a dimension thereof transverse to said direction and with said taper in thickness enabling a variation in response of said transducer corresponding to said range of signals;
   means for effecting relative movement of said transducer and said beam to align said acoustic waves in interacting relationship with said beam in correlation with the region of said transducer productive of the acoustic waves at a selected frequency of the acoustic signals;
   and means responsive to a portion of said light beam diffracted by said acoustic waves for developing a corresponding signal.
2. Apparatus as defined in claim 1 wherein said acoustic waves and light are oriented to intersect in accordance with the Bragg angle corresponding to the wavelengths of the acoustic waves and light.
3. Apparatus as defined in claim 2 including means for maintaining interaction at the Bragg angle throughout a range of acoustic frequencies.
4. Apparatus as defined in claim 3 wherein said moving means adjusts the position of said transducer relative to said light beam in correspondence with maintenance of said interaction of the Bragg angle.
5. Apparatus as defined in claim 4 which includes means for tuning said transducer to the frequency of said acoustic signals in correspondence with adjustment of said position of said transducer.

6. Apparatus as defined in claim 1 in which said transducer includes means for resonating the capacitance across said transducer.

7. Apparatus as defined in claim 1 wherein said moving means moves said transducer in the direction of said dimension.

8. Apparatus as defined in claim 1 in which said thickness is tapered linearly.

No references cited.

ROY LAKE, *Primary Examiner.*

D. R. HOSTETTER, *Assistant Examiner.*